United States Patent
Vincent et al.

(10) Patent No.: US 11,403,084 B2
(45) Date of Patent: Aug. 2, 2022

(54) SYSTEM AND METHOD FOR IMPLEMENTING AN ORCHESTRATION ENGINE

(71) Applicant: JPMorgan Chase Bank, N.A., New York, NY (US)

(72) Inventors: Jijo Vincent, Singapore (SG); C. G. Jayesh, Singapore (SG); Ruchir Srivastava, Singapore (SG); Arut Prakash Thanushkodi Ravindran, Singapore (SG); Joseph Oddo, Staten Island, NY (US); Anthony Byers, New York, NY (US); Mathew Benwell, Singapore (SG); Keerthi Kumar Gunda, Singapore (SG)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/145,546

(22) Filed: Jan. 11, 2021

(65) Prior Publication Data
US 2021/0216295 A1      Jul. 15, 2021

Related U.S. Application Data

(60) Provisional application No. 62/959,290, filed on Jan. 10, 2020.

(51) Int. Cl.
*H04L 12/26* (2006.01)
*G06F 8/65* (2018.01)
(Continued)

(52) U.S. Cl.
CPC .............. *G06F 8/60* (2013.01); *G06F 9/547* (2013.01); *H04L 67/02* (2013.01); *H04L 67/16* (2013.01);
(Continued)

(58) Field of Classification Search
CPC ..... G06F 8/60; G06F 8/61; G06F 8/62; G06F 8/65; G06F 9/547; G06F 9/44505;
(Continued)

(56) References Cited

U.S. PATENT DOCUMENTS

2010/0153941 A1* 6/2010 Borissov .................. G06F 8/65
                                                                  717/168
2014/0130036 A1  5/2014 Gurikar et al.
(Continued)

OTHER PUBLICATIONS

James Paris, A Comprehensive System for Non-lntrusive Load Monitoring and Diagnostics, Sep. 2013, [Retrieved on Apr. 12, 2022]. Retrieved from the internet: <URL: https://dspace.mit.edU/bitstream/handle/1721.1/84720/868824138-MIT.pdf?sequence=2&isAllowed=y> 8 Pages (1427-1434) (Year: 2013).*
(Continued)

*Primary Examiner* — Anibal Rivera
(74) *Attorney, Agent, or Firm* — Greenblum & Bernstein, P.L.C.

(57) ABSTRACT

Performing Splunk code deployment in existing environments has been a challenge for support teams due to the large infrastructure footprint and the number of moving parts. An embodiment of the present invention is directed to an Orchestration Engine to automatically execute the Splunk Deployment releases with reduced downtime and enhanced logging and traceability. This automation will not only help eliminate inefficient and resource-intensive manual processes involved in promoting changes to production, but also carry out validations and reduce human errors thereby providing a more stable and reliable platform for end users.

20 Claims, 8 Drawing Sheets

(51) Int. Cl.
*G06F 8/60* (2018.01)
*H04L 67/51* (2022.01)
*H04L 67/02* (2022.01)
*G06F 9/54* (2006.01)
*H04L 41/082* (2022.01)
*G06F 8/61* (2018.01)
*H04L 67/00* (2022.01)

(52) U.S. Cl.
CPC .............. *G06F 8/61* (2013.01); *G06F 8/62* (2013.01); *G06F 8/65* (2013.01); *H04L 41/082* (2013.01); *H04L 67/34* (2013.01)

(58) Field of Classification Search
CPC ....... G06F 9/5072; H04L 67/02; H04L 67/16; H04L 67/34; H04L 41/082
See application file for complete search history.

(56) References Cited

U.S. PATENT DOCUMENTS

| | | |
|---|---|---|
| 2015/0066815 A1 | 3/2015 | Salvaggio |
| 2018/0146000 A1 | 5/2018 | Muddu et al. |
| 2018/0307472 A1* | 10/2018 | Paul ........................ H04L 67/34 |
| 2019/0052550 A1 | 2/2019 | Mordani et al. |
| 2019/0220285 A1* | 7/2019 | Ali ....................... G06F 9/44505 |
| 2019/0312800 A1* | 10/2019 | Schibler ................ H04L 41/082 |

OTHER PUBLICATIONS

Notification of Transmittal of the International Search Report and The Written Opinion of the International Searching Authority issued in PCT/US21/12884 dated Apr. 2, 2021.

* cited by examiner

| HISTORY | Task-7xx81 ⊗ |
|---|---|

Task Summary

Ref ID: 7xx81

Task Name: Upgrade_HEAVY_FORWARDER

Host: _____

Created Date: 2020 Nov 6 12:16:41

Last Update: 2020 Nov 6 12:37:22

Status: Completed

610

| Total Tasks : 70 | Completed : 60 | In Progress : 0 | Pending : 0 | Failed : 0 | Cancelled : 0 | Fixed : 1 |

| | Sub Tasks | | | Actions | | | | Sub Tasks - Stats | | | |
|---|---|---|---|---|---|---|---|---|---|---|---|
| | | | | | Total | Completed | inProgress | Pending | Failed | Fixed | Cancelled |
| Ref ID | Hostname | Status | Date | | | | | | | | |
| 7xx48 | xxx262 | Completed | 2020 Nov 6 12:27:44 | | 14 | 14 | 0 | 0 | 0 | 0 | 0 |
| 7xx70 | xxx263 | Completed | 2020 Nov 6 12:28:11 | | 14 | 14 | 0 | 0 | 0 | 0 | 0 |
| 7xx04 | xxx807 | Completed | 2020 Nov 6 12:28:44 | | 14 | 14 | 0 | 0 | 0 | 0 | 0 |
| 7xx26 | xxx677 | Completed | 2020 Nov 6 12:29:44 | | 14 | 14 | 0 | 0 | 0 | 0 | 0 |

HISTORY

| Task-7xx81 ⊗ | Task-7xx48 ⊗ |

Task Summary

Ref ID: 7xx48

Task Name: xxx262

Host: xxx262

Created Date: 2020 Nov 6 12:16:41

Last Update: 2020 Nov 6 12:27:44

Status: Completed

710

| Total Tasks : 14 | Completed : 14 | In Progress : 0 | Pending : 0 | Failed : 0 | Cancelled : 0 | Fixed : 0 |

Sub Tasks

Actions

| | | | | | | | Sub Tasks - Stats | | | | | |
|---|---|---|---|---|---|---|---|---|---|---|---|---|
| Ref ID | Name | Hostname | Status | Date | | | Total | Completed | inProgress | Pending | Failed | Fixed | Cancelled |
| 7xx49 | Stop_Splunk | xxx262 | Completed | 2020 Nov 6 12:18:33 | 2 | 2 | 0 | 0 | 0 | 0 | 0 |
| 7xx52 | Perform_Backup | xxx262 | Completed | 2020 Nov 6 12:20:11 | 2 | 2 | 0 | 0 | 0 | 0 | 0 |
| 7xx55 | Move_Backup | xxx262 | Completed | 2020 Nov 6 12:21:22 | 2 | 2 | 0 | 0 | 0 | 0 | 0 |
| 7xx58 | Extract_Archive | xxx262 | Completed | 2020 Nov 6 12:23:22 | 2 | 2 | 0 | 0 | 0 | 0 | 0 |
| 7xx61 | First_Start | xxx262 | Completed | 2020 Nov 6 12:25:11 | 2 | 2 | 0 | 0 | 0 | 0 | 0 |

| HISTORY | Initiate New ⊗ | Task-7xx81 ⊗ | Task-7xx48 ⊗ | Task-7xx49 ⊗ |

Task Summary

Ref ID _7xx49_

Task Name _Stop_Splunk_

Host _xxx262_

Created Date _2020 Nov 6 12:16:41_

Last Update _2020 Nov 6 12:18:33_

Status _Completed_

810

| Total Tasks : 2 | Completed : 2 | In Progress : 0 | Pending : 0 | Failed : 0 | Cancelled : 0 | Fixed : 0 |

| Sub Tasks | | | Actions | Sub Tasks – Stats | | | | | | Logs | | |
|---|---|---|---|---|---|---|---|---|---|---|---|---|
| | | | | Total | Completed | inProgress | Pending | Failed | Fixed | Cancelled | Input | StdOut | StdErr |

| Ref ID | Name | Hostname | Status | Date | | | | | | | | | |
|---|---|---|---|---|---|---|---|---|---|---|---|---|---|
| 7xx50 | Invoke_AAAS_Service | xxx262 | Completed | 2020 Nov 6 12:17:23 | 0 | 0 | 0 | 0 | 0 | 0 | 0 | ☐ | ☐ | ☐ |
| 7xx51 | Get_AAAS_Result | xxx262 | Completed | 2020 Nov 6 12:18:14 | 0 | 0 | 0 | 0 | 0 | 0 | 0 | ☐ | ☐ | ☐ |

SYSTEM AND METHOD FOR IMPLEMENTING AN ORCHESTRATION ENGINE

CROSS REFERENCE TO RELATED APPLICATIONS

The application claims priority to U.S. Provisional Application 62/959,290, filed Jan. 10, 2020, the contents of which are incorporated herein in their entirety.

FIELD OF THE INVENTION

The invention relates generally to a system and method for implementing an orchestration engine to automatically deploy applications in a distributed environment.

BACKGROUND OF THE INVENTION

Splunk represents a software platform to search, analyze and visualize machine generated data from various sources, including websites, applications, sensors, devices. Cyber Splunk provides the ability to monitor and analyze Information Security logs and application files. It further enables efficient diagnosis of problems (e.g., latency in response times, etc.) coupled with decreased mean time to resolution of security incidents. Accordingly, it is imperative that the application is reliable and highly-available for security analysts to respond to events and incidents.

Currently, support teams perform changes (e.g., deployment of new apps, updating existing apps in production environment, etc.) in the Splunk environment regularly (e.g., every week) in a pre-defined procedure and in a certain order. Tasks are generally executed manually based on release documentation.

Significant drawbacks that exist in the current deployment process include: multiple release documents (15-20 pages long each); manual backup of various Splunk components (e.g., 6 hours of manual effort); manual deployment from multiple assets; manual validation across all components; break glass of privileged accounts; and resource intensive processes (e.g., 10-15 deployments per week taking approximately three days).

Moreover, the manual work required in current processes is prone to human error which results in instability and unavailability of the platform for users.

These and other drawbacks exist.

SUMMARY OF THE INVENTION

According to an embodiment, the invention relates to a system that implements an orchestration engine in a software platform environment, such as Splunk. The system comprises: an electronic input configured to receive an input configuration file via a web layer; a database configured to communicate with a data access layer and further configured to store states, data and logs; and an orchestration engine comprising a computer processor, the orchestration engine coupled to the electronic input and the database and further programmed to perform the steps of: receiving deployment input data from the input configuration file; initiating a deployment data enrichment process based on the deployment input data; performing a pre-validation service that submits a pre-validation service invocation request and receives one or more validation results; applying an operation execution that deploys an application and restarts a subset of software components; performing a post-validation service of an entire infrastructure that submits a post-validation service invocation request and receives one or more validation results; and generating and providing, via an interactive interface, status relating to the deployment data enrichment process, wherein the interactive interface comprises a deployment status portion, a feed details portion, a deployment summary portion and a deployment history portion.

According to another embodiment, the invention relates to method that implements an orchestration engine in a software platform environment, such as Splunk. The method comprises the steps of: receiving, via an electronic input, deployment input data from an input configuration file, wherein the electronic input is configured to receive an input configuration file via a web layer; initiating, via an orchestration engine, a deployment data enrichment process based on the deployment input data, wherein the orchestration engine comprises a computer processor and is coupled to the electronic input and a database, wherein the database is configured to communicate with a data access layer and further configured to store states, data and logs; performing a pre-validation service that submits a pre-validation service invocation request and receives one or more validation results; applying an operation execution that deploys an application and restarts a subset of software components; performing a post-validation service of an entire infrastructure that submits a post-validation service invocation request and receives one or more validation results; and generating and providing, via an interactive interface, status relating to the deployment data enrichment process, wherein the interactive interface comprises a deployment status portion, a feed details portion, a deployment summary portion and a deployment history portion.

An embodiment of the present invention may include a specially programmed computer system comprising one or more computer processors, interactive interfaces, electronic storage devices, and networks. The computer implemented system and method described herein provide unique advantages to entities, security analysts, users and other participants. An embodiment of the present invention is directed to eliminating inefficient and resource intensive processes to deliver application code into a distributed environment with confidence. The innovative solution further addresses inefficiencies relating to human error, frequent releases and downtime. An embodiment of the present invention seeks to facilitate and improve required logging and traceability. In addition, users may engage in an automated or one click deployment solution that reduces significant execution time for application code releases. This further eliminates manual intervention, automated backups, document reviews thereby significantly reducing or even eliminating human error and providing an end-to-end validation. An embodiment of the present invention further promotes ease of use by providing a single platform to track execution progress and historical changes, monitor change related logs, track errors, trace and correlate deployment issues.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the present invention.

FIG. 6 is an exemplary user interface, according to an embodiment of the present invention.

FIG. 7 is an exemplary user interface, according to an embodiment of the present invention.

FIG. 8 is an exemplary user interface, according to an embodiment of the present invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art in light of known systems and methods, would appreciate the use of the invention for its intended purposes and benefits in any number of alternative embodiments, depending upon specific design and other needs.

Performing Splunk code deployment in existing environments is a challenge for support teams due to the extensive infrastructure footprint and a large number of moving parts. An embodiment of the present invention is directed to an Orchestration Engine that automatically executes Splunk Deployment releases with reduced downtime and enhanced logging and traceability. This innovative automation solution seeks to eliminate inefficient and resource-intensive manual processes involved in promoting changes to production and further carrying out validations. This results in significantly reduced human errors thereby providing a more stable and reliable platform for end users.

An embodiment of the present invention is directed to building an end-to-end process automation solution to perform various activities involved in the release of changes in a Splunk or other environment. The deployment process realizes efficiencies by significantly reducing manual interaction thereby alleviating the process from human errors which is common in current scenarios.

Embodiments of the present invention may include additional features and functions, such as unattended deployment and validations; reduction or elimination of human errors from implementation and validation; increased productivity (e.g., reduces days of manual effort to hours); ability to pause and resume from the point of failure; ability to roll back changes swiftly if needed; site based deployments for increased resiliency; implementer independence; visualization and telemetry; alerting to support team for warnings, failures and other conditions; logging and traceability; and automated rebuild and upgrade.

An embodiment of the present invention is directed to deploying and updating applications and technology add-ons to a Splunk infrastructure, for example. In addition, fully automated deployments may be provided based on user acceptance in testing and making it a firmwide solution that may be leveraged by other Lines of Business and users within the firm.

Figure 1:
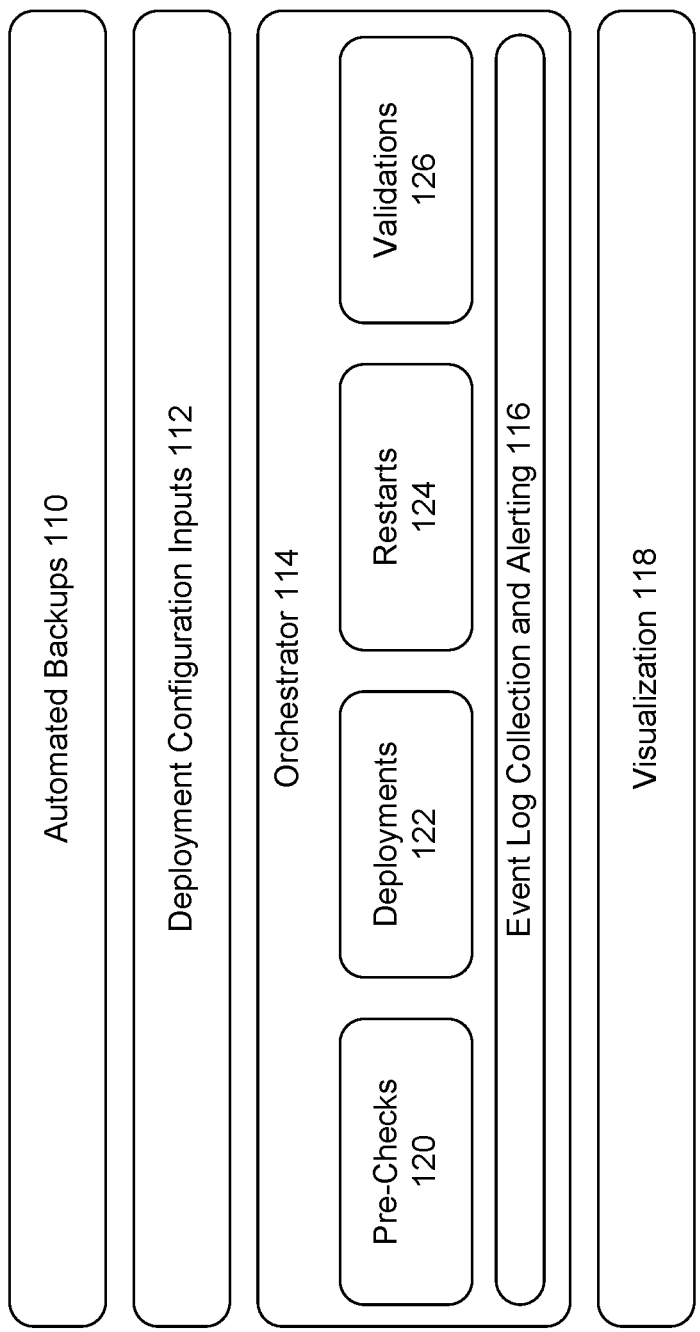
FIG. 1 is an exemplary system diagram, according to an embodiment of the present invention.

FIG. 1 is an exemplary system diagram, according to an embodiment of the present invention. An embodiment of the present invention is directed to building an automated release solution to perform deployment of new applications and/or update existing applications in Splunk using microservices and orchestration workflows that control execution of the deployment. The system of FIG. 1 may include Automated Backups 110, Deployment Configuration Inputs 112, Orchestrator 114, Event Log Collection and Alerting 116 and Visualization 118. As shown in FIG. 1, Orchestrator 114 may include functions including Pre-Checks 120, Deployments 122, Restarts 124 and Validations 126.

Automated Backups 110 may include backups (such as weekly backups) on key Splunk components which may be automatically triggered via a scheduler. Other intervals for backups may be applied.

Deployment Configuration Inputs 112 may be handled via a Java program to orchestrate blueprints of automation tasks, such as Ansible playbooks, to achieve an end goal. For example, a Java orchestrator may perform pre-checks, followed by an actual deployment, then restart specific Splunk components as needed and finally perform a complete validation of an entire infrastructure.

With Event Log Collection and Alerting 116, a Java orchestrator may additionally collect logs and send warning/failure alerts to impacted teams for intervention.

The automation solution may also provide users with a web user interface (UI) to initiate and track changes, represented by Visualization 118. Any errors or unforeseen situations may also be presented on the UI for users to take appropriate action.

Figure 2:
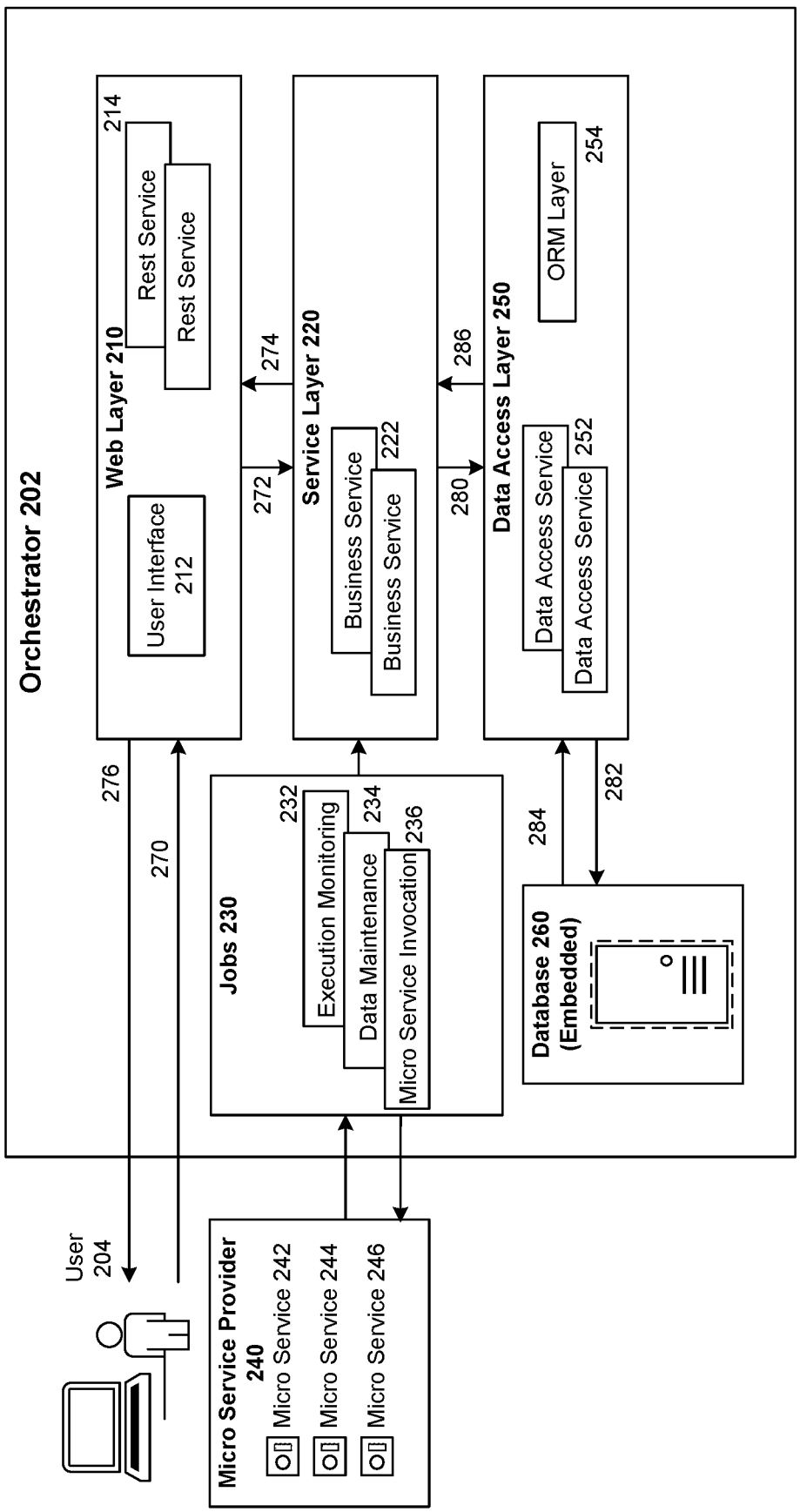
FIG. 2 is a detailed illustration of Orchestrator, according to an embodiment of the present invention.

FIG. 2 is an exemplary Orchestrator workflow, according to an embodiment of the present invention. For example, FIG. 2 illustrates an exemplary workflow of a Splunk Release Orchestrator. An embodiment of the present invention provides an orchestrator with a configuration file and an automation engine that may decide how, where and what to deploy and what components to restart.

As shown in FIG. 2, User 204 may interact with Orchestrator 202. Orchestrator 202 may include Web Layer 210, Service Layer 220, Jobs 230, Data Access Layer 250 and Database 260. Jobs 230 may interact with Micro Service Provider 240. Web Layer 210 may further include User Interface 212 and one or more Services, e.g., REST (Representational state transfer) Service 214. Service Layer 220 may include one or more Services, e.g., Business Service 222. Jobs 230 may include Execution Monitoring 232, Data Maintenance 234, Micro Service Invocation 236 and other services. Micro Service Provider 240 may include a plurality of micro services 242, 244, 246. Data Access Layer 250 may include services, e.g., Data Access Services 252 and Object-Relational Mapping (ORM) Layer 254.

As shown in FIG. 2, User 204 may send a request to Web Layer 210, via 270. Web Layer 210 may interact with Service Layer 220, via 272 and 274. Service Layer 220 may send a request to Data Access Layer 250, via 280. Data Access Layer 250 may interact with Database 260, via 282 and 284. Data Access Layer 250 may respond to Service Layer 220, via 286. Web Layer 210 may send a response to User 204, via 276. Other flows and interactions may be supported by the system illustrated in FIG. 2.

Figure 3:
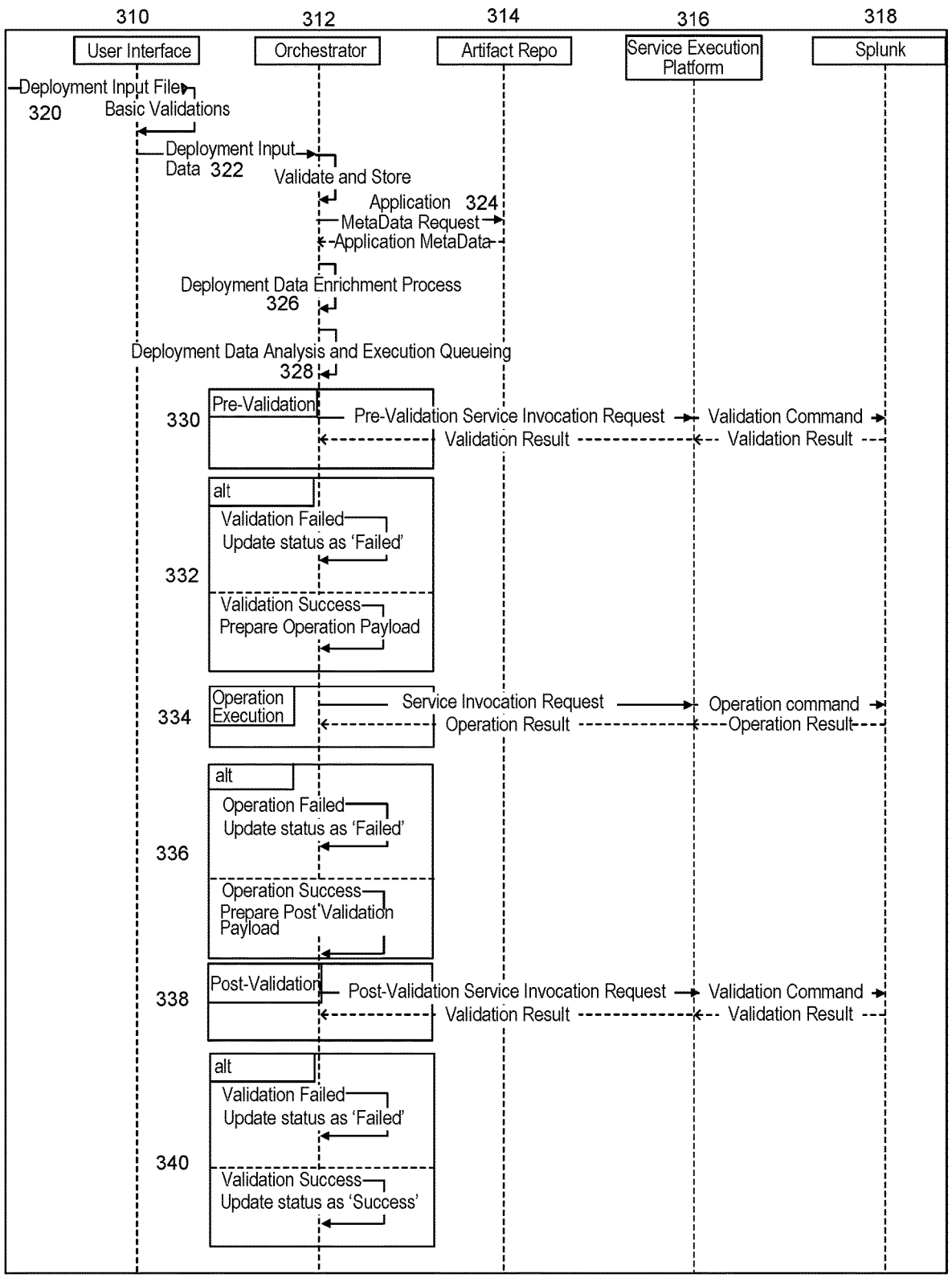
FIG. 3 is an exemplary process flow, according to an embodiment of the present invention.

FIG. 3 is an exemplary process flow, according to an embodiment of the present invention. FIG. 3 illustrates interactions between User Interface 310, Orchestrator 312, Artifact Repository 314, Service Execution Platform 316 and Splunk 318. While the Figures illustrate Splunk, other software platforms and services may be implemented including other systems that search, analyze and visualize machine generated data gathered from various sources such as websites, applications, sensors, devices, etc. At step 320, Deployment Input File may be received and Basic Validations may be performed at User Interface 310. At step 322, Deployment Input Data may be received, validated and stored by Orchestrator 312. At 324, Application Metadata request may be sent to Artifact Repository 314. In response, Application Metadata may be received by Orchestrator 312. At step 326, Deployment Data Enrichment Process may be applied by Orchestrator 312. At step 328, Deployment Data Analysis and Execution Queuing may be applied.

Various validation and other functions may be initiated and executed by Orchestrator 312. At step 330, Pre-Validation may be performed. Pre-validation service invocation request and validation command may be sent. Validation results may be provided in response. At step 332, validation may be determined. If the validation failed, status may be updated as "failed." If the validation is successful, Orchestrator 312 may prepare an operation payload.

At step 334, Operation Execution may be performed. Service invocation request and operation command may be sent. Operation results may be provided in response. At step 336, validation may be determined. If the operation failed, status may be updated as "failed." If the operation is successful, Orchestrator 312 may prepare a post validation payload.

At step 338, Post-Validation may be performed. Post-Validation service invocation request and validation command may be sent. Validation results may be provided in response. At step 340, validation may be determined. If the validation failed, status may be updated as "failed." If the validation is successful, status may be updated as "success."

While the process of FIG. 3 illustrates certain steps performed in a particular order, it should be understood that the embodiments of the present invention may be practiced by adding one or more steps to the processes, omitting steps within the processes and/or altering the order in which one or more steps are performed.

Figure 4:
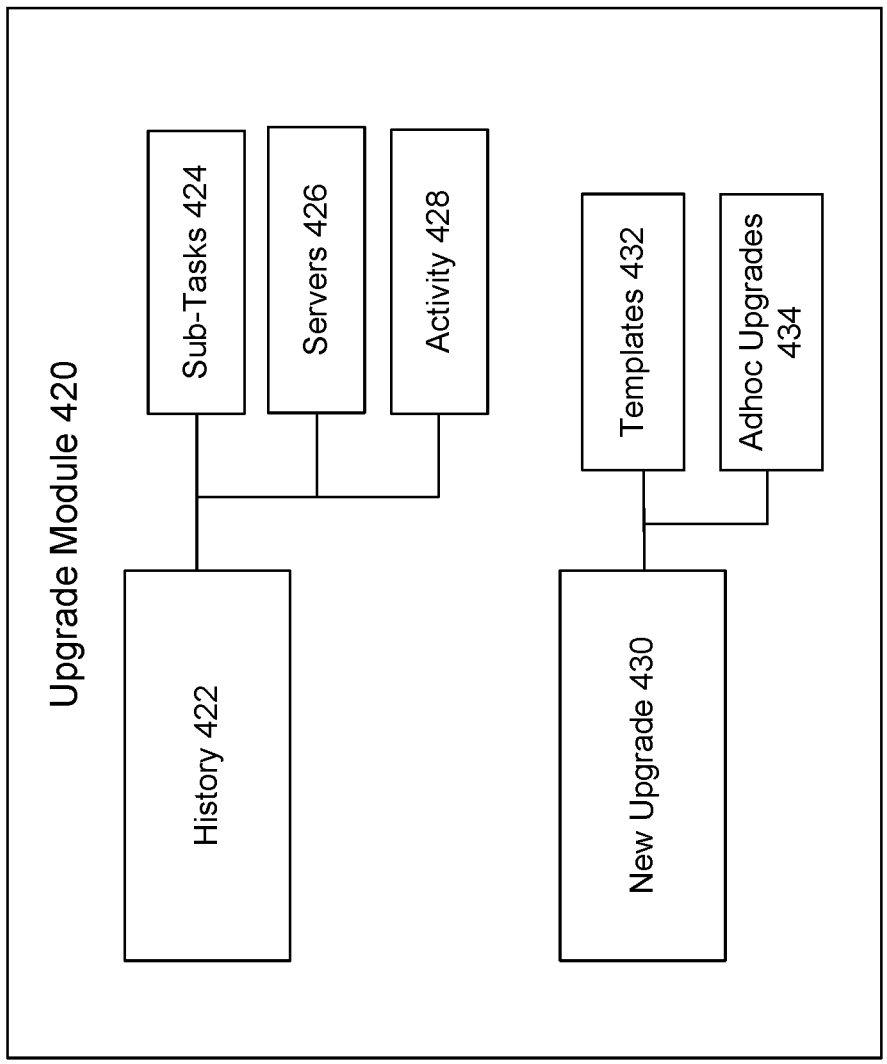
FIG. 4 is an exemplary user interface, according to an embodiment of the present invention.
Figure 4:
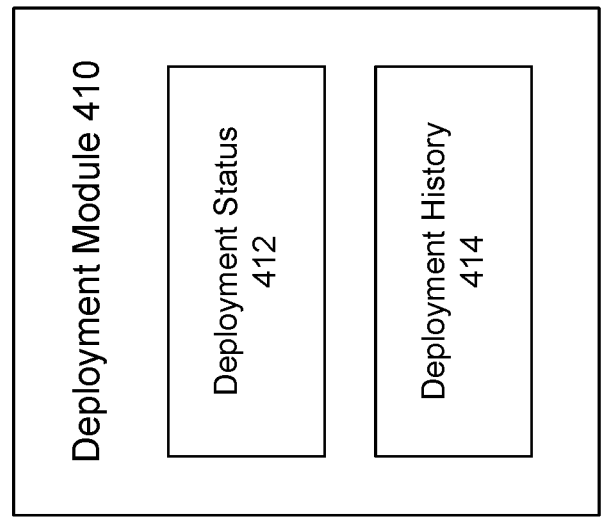
Figure 5:
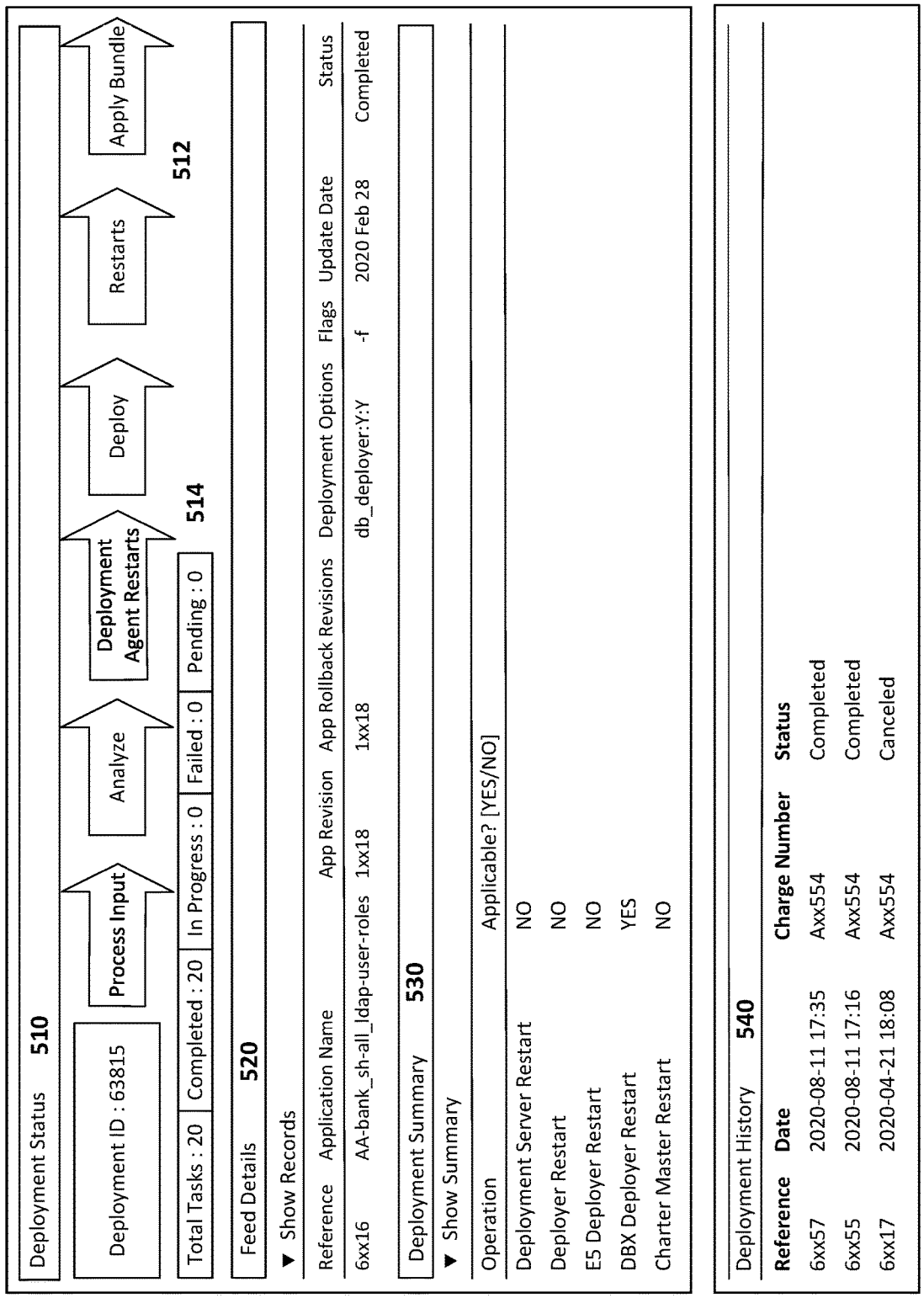
FIG. 5 is an exemplary user interface, according to an embodiment of the present invention.

FIG. 4 is an exemplary user interface, according to an embodiment of the present invention. FIG. 4 may include Deployment Module 410 and Upgrade Module 420. Deployment Module 410 may relate to application deployments in Splunk, for example. Upgrade Module 420 may relate to product upgrades in Splunk, for example. Deployment Module 410 may support Deployment Status 412 and Deployment History 414. FIG. 5 is an exemplary illustration of a Deployment interface.

Upgrade Module 420 may support History 422 and New Upgrade 430. History 422 may provide details concerning Sub-Tasks 424, Servers 426 and Activity 428. New Upgrade 430 may enable a user to initiate a new upgrade through Templates 432 and Adhoc Upgrades 434.

For example, Upgrade Module 420 may display a history of upgrade operations performed as shown by History 422. The items may be listed in descending order of timestamp, for example. Other filter options may be provided. The history page may include additional details including reference identifier, name of the upgrade activity, user identifier of person or entity who submitted the operation, corresponding change reference number (or identifier) in change management system, status of the operation, time stamp, actions (e.g., pause, resume, cancel or other actions depending on the current status of operation), sub-tasks statistics under each operations, etc.

With Upgrade Module 420, a user may submit a new upgrade activity, as shown by New Upgrade 430. For example, a user may select a predefined template at Template 432. Each template may be tied to a particular set of hosts, resources and activities depending on its functional and technical domain. For example, templates may include Deployment Server, License Master, Monitoring Console, Indexer Site Rolling Upgrade, Cluster upgrade, etc. After selecting the template, the user may view the list of servers (or other resources) related to the template. The user may then trigger the upgrade by interacting with an interface. For example, the user may input change details including change type, servers to exclude, change reference, identifier, etc. According to another example, a user may initiate an adhoc upgrade through Adhoc Upgrades 434. This may involve executing a default upgrade procedure on any service provided by the user through an interface. For example, the user may provide change details including change type, server list, identifier, change reference, etc. Once the operation is submitted, the status may be viewed and tracked from a History page.

Users may drilldown to view the status of sub-tasks by interacting with a reference identifier to open a new tab with sub-task details. The drill down activity may be performed until there are no sub-tasks under the current task. Exemplary details may be provided as shown in FIGS. 6-8.

FIG. 5 is an exemplary user interface, according to an embodiment of the present invention. FIG. 5 provides Deployment Status 510, Feed Details 520, Deployment Summary 530 and Deployment History 540. Deployment Status 510 may include a graphic 512 that provides details on deployment stages including Process Input, Analyze, Deployment Agent Restarts, Deploy, Restarts, Apply Bundle, etc. Another graphic shown at 514 may provide a count of tasks, including Total Tasks, Completed, In Progress, Failed and Pending. Other metrics and analytics may be provided. Feed Details 520 may include input data, records and corresponding details, e.g., reference identifier, application name, app revision, app rollback revisions, deployment options, flags, update date and status, etc. Deployment Summary 530 may include summary data concerning operations. Deployment History 540 may include reference identifier, date, change number (or identifier), status, etc.

FIG. 6 is an exemplary user interface, according to an embodiment of the present invention. As shown in FIG. 6, a user may view details concerning sub-tasks. In the example of FIG. 6, task summary is provided for a particular task, as noted at 610. In particular, FIG. 6 illustrates the servers the upgrade operation is scheduled to run on, as shown at 620.

FIG. 7 is an exemplary user interface, according to an embodiment of the present invention. By selecting an entry in 620 of FIG. 6, a user may view task summary 710 and details concerning individual steps at 720. For example, FIG. 7 illustrates individual steps that are part of the upgrade activity, as shown at 720.

FIG. 8 is an exemplary screenshot, according to an embodiment of the present invention. By selecting an entry in 720 of FIG. 7, a user may view task summary at 810 and details concerning upgrade activities at 820. In addition, a user may view logs of each activity at 830.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements an orchestration engine in a software platform environment, the system comprising:
    an electronic input configured to receive an input configuration file via a web layer;
    a database configured to communicate with a data access layer and further configured to store states, data and logs; and an orchestration engine comprising a computer processor, the orchestration engine coupled to the electronic input and the database and further programmed to perform the steps of:

receiving deployment input data from the input configuration file;

initiating a deployment data enrichment process based on the deployment input data;

performing a pre-validation service that submits a pre-validation service invocation request and receives one or more validation results;

applying an operation execution that deploys an application and restarts a subset of software components;

performing a post-validation service of an entire infrastructure that submits a post-validation service invocation request and receives one or more validation results;

generating and providing, via an interactive interface, status relating to the deployment data enrichment process, wherein the interactive interface comprises a deployment status portion, a feed details portion, a deployment summary portion and a deployment history portion;

generating and transmitting one or more alerts to one or more impacted teams for intervention; and displaying history data of upgrade operations listed in a descending order of timestamp, wherein the history data includes a history page detailing data of a name of an upgrade activity, user identifier of person or entity who submitted the operation, status of the operation, time stamp, actions, and sub-tasks statistics data under each operation.

2. The system of claim 1, wherein the data access layer is configured to communicate with a service layer that executes one or more business services.

3. The system of claim 2, wherein the data access layer is configured to communicate with the web layer that executes the interactive interface that receives one or more inputs from a user.

4. The system of claim 1, wherein the deployment status portion comprises deployment stage progress.

5. The system of claim 4, wherein the deployment stage progress comprises process input and deployment agent restarts.

6. The system of claim 1, wherein the deployment summary portion comprises summary data relating to one or more operations.

7. The system of claim 1, wherein the deployment history portion comprises data relating to reference identifier, date, change identifier and status data.

8. The system of claim 1, wherein the orchestration engine is further programmed to perform the step of: collecting event log data.

9. The system of claim 1, wherein the actions include pause, resume, cancel or other actions depending on the current status of operation.

10. The system of claim 1, wherein the software platform environment is Splunk.

11. A method that implements an orchestration engine in a software platform environment, the method comprising the steps of:

receiving, via an electronic input, deployment input data from an input configuration file, wherein the electronic input is configured to receive an input configuration file via a web layer;

initiating, via an orchestration engine, a deployment data enrichment process based on the deployment input data, wherein the orchestration engine comprises a computer processor and is coupled to the electronic input and a database, wherein the database is configured to communicate with a data access layer and further configured to store states, data and logs;

performing a pre-validation service that submits a pre-validation service invocation request and receives one or more validation results;

applying an operation execution that deploys an application and restarts a subset of software components;

performing a post-validation service of an entire infrastructure that submits a post-validation service invocation request and receives one or more validation results;

generating and providing, via an interactive interface, status relating to the deployment data enrichment process, wherein the interactive interface comprises a deployment status portion, a feed details portion, a deployment summary portion and a deployment history portion;

generating and transmitting one or more alerts to one or more impacted teams for intervention; and displaying history data of upgrade operations listed in a descending order of timestamp, wherein the history data includes a history page detailing data of a name of an upgrade activity, user identifier of person or entity who submitted the operation, status of the operation, time stamp, actions, and sub-tasks statistics data under each operation.

12. The method of claim 11, wherein the data access layer is configured to communicate with a service layer that executes one or more business services.

13. The method of claim 12, wherein the data access layer is configured to communicate with a web layer that executes the interactive interface that receives one or more inputs from a user.

14. The method of claim 11, wherein the deployment status portion comprises deployment stage progress.

15. The method of claim 14, wherein the deployment stage progress comprises process input and deployment agent restarts.

16. The method of claim 11, wherein the deployment summary portion comprises summary data relating to one or more operations.

17. The method of claim 11, wherein the deployment history portion comprises data relating to reference identifier, date, change identifier and status data.

18. The method of claim 11, further comprising the step of: collecting event log data.

19. The method of claim 11, wherein the actions include pause, resume, cancel or other actions depending on the current status of operation.

20. The method of claim 11, wherein the software platform environment is Splunk.

* * * * *